(12) United States Patent
Kobayashi et al.

(10) Patent No.: US 12,234,181 B2
(45) Date of Patent: Feb. 25, 2025

(54) SUPPORTING GLASS SUBSTRATE AND LAMINATED BODY

(71) Applicant: AGC Inc., Tokyo (JP)

(72) Inventors: Yusuke Kobayashi, Tokyo (JP); Izuru Kashima, Tokyo (JP); Kazutaka Ono, Tokyo (JP); Seiji Inaba, Tokyo (JP); Hirofumi Yamamoto, Tokyo (JP); Kiyoshi Tamai, Tokyo (JP)

(73) Assignee: AGC INC., Tokyo (JP)

( * ) Notice: Subject to any disclaimer, the term of this patent is extended or adjusted under 35 U.S.C. 154(b) by 609 days.

(21) Appl. No.: 17/093,121

(22) Filed: Nov. 9, 2020

(65) Prior Publication Data

US 2021/0147279 A1 May 20, 2021

(30) Foreign Application Priority Data

Nov. 18, 2019 (JP) ................... 2019-208195

(51) Int. Cl.
*C03C 3/087* (2006.01)
*B32B 17/10* (2006.01)
*C03C 4/18* (2006.01)
*C03C 21/00* (2006.01)

(52) U.S. Cl.
CPC ........ *C03C 3/087* (2013.01); *B32B 17/10119* (2013.01); *B32B 17/10137* (2013.01); *C03C 4/18* (2013.01); *C03C 21/002* (2013.01); *B32B 2315/08* (2013.01); *B32B 2457/14* (2013.01); *C03C 2204/00* (2013.01)

(58) Field of Classification Search
None
See application file for complete search history.

(56) References Cited

U.S. PATENT DOCUMENTS

| | | | |
|---|---|---|---|
| 2013/0295357 A1* | 11/2013 | Cleary | B32B 17/10761 428/215 |
| 2014/0175333 A1* | 6/2014 | Kim | H01L 33/56 528/33 |
| 2014/0226090 A1 | 8/2014 | Akiba et al. | |
| 2015/0132538 A1* | 5/2015 | Cleary | B32B 17/10137 428/141 |
| 2015/0147538 A1 | 5/2015 | Ishimaru et al. | |
| 2017/0022093 A1* | 1/2017 | DeMartino | C03C 21/002 |
| 2017/0028687 A1* | 2/2017 | DeRosa | C08F 220/282 |
| 2017/0103249 A1* | 4/2017 | Jin | H05K 3/22 |
| 2017/0297946 A1 | 10/2017 | Katayama et al. | |
| 2018/0154615 A1* | 6/2018 | Dohn | B32B 17/10266 |
| 2018/0244560 A1* | 8/2018 | Gross | C03C 21/002 |
| 2018/0281355 A1* | 10/2018 | Cleary | B32B 17/10761 |

(Continued)

FOREIGN PATENT DOCUMENTS

| | | |
|---|---|---|
| CN | 107056088 A | 8/2017 |
| CN | 108473362 A | 8/2018 |
| JP | 2014-001094 A | 1/2014 |

(Continued)

*Primary Examiner* — Tamra L. Dicus
(74) *Attorney, Agent, or Firm* — Foley & Lardner LLP

(57) ABSTRACT

A supporting glass substrate includes a compression stress layer on a surface thereof, and has an average thermal expansion coefficient at 50° C. to 200° C. that is 7 ppm/° C. to 15 ppm/° C., an internal tensile stress that is 5 MPa to 55 MPa, and a depth of the compression stress layer that is 10 μm to 60 μm.

10 Claims, 1 Drawing Sheet

(56) References Cited

U.S. PATENT DOCUMENTS

2018/0305241 A1   10/2018  Sawamura et al.
2019/0002328 A1*  1/2019  Lezzi .................... C03B 27/044

FOREIGN PATENT DOCUMENTS

| TW | 201343385 A | 11/2013 |
|----|----|----|
| TW | 201736298 A | 10/2017 |
| WO | WO-2013/073685 A1 | 5/2013 |
| WO | WO-2016/111158 A1 | 7/2016 |
| WO | WO-2018/008358 A1 | 1/2018 |

* cited by examiner

SUPPORTING GLASS SUBSTRATE AND LAMINATED BODY

CROSS-REFERENCE TO RELATED APPLICATION(S)

This application claims priority from Japanese Application No. 2019-208195, filed on Nov. 18, 2019, the contents of which are incorporated by reference herein in its entirety.

BACKGROUND OF THE INVENTION

1. Field of the Invention

The present invention relates to a supporting glass substrate and a laminated body.

2. Description of the Related Art

In accordance with miniaturization of electronic apparatuses, there is an increasing demand for a technique for mounting semiconductor devices used for such electronic apparatuses with high density. Recently, as a technique for mounting semiconductor devices with high density, Fan Out Wafer Level Package (FOWLP) and Fan Out Panel Level Package (FOPLP) have been proposed, for example. Hereinafter, FOWLP and FOPLP will together be referred to as FOWLP and the like.

In FOWLP and the like, there may be a case that uses a supporting glass substrate for supporting a process substrate so as to suppress deflection of the process substrate where the semiconductor device is to be stacked (see International Publication No. WO 2018/008358, International Publication No. WO 2016/111158, for example).

The supporting glass substrate used for supporting a member, such as the supporting glass substrate for FOWLP and the like, may be heated when heating the member to be supported. Thus, in order to suppress separation from the member and the like, the thermal expansion coefficient of the supporting glass substrate may be set in accordance with the member. For example, in a case where the thermal expansion coefficient of the member is high, the thermal expansion coefficient of the supporting glass substrate is also set to be high accordingly.

As for the supporting glass substrate, the temperature distribution when heated may become nonuniform, however. For example, when the substrate is thick, it is likely to have a temperature difference between a heated surface and a center part. In this case, due to the difference in the temperature distribution, it is concerned that the supporting glass substrate may be warped and damaged since the thermal expansion amount varies at each position. In particular, the supporting glass substrate of high thermal expansion coefficient has a large difference in the thermal expansion amounts at each of the positions, so that the risk of damage due to the warp is high. Therefore, it is required to reduce damage of the supporting glass substrate of high thermal expansion coefficient.

Furthermore, the supporting glass substrate may also be reused and, in such a case, it is difficult to perfectly prevent breaking. When the glass substrate breaks and generates a great number of fragmental pieces, it takes a long time to remove such fragmental pieces scattered to the vicinity of manufacturing equipment since it is extremely important to prevent mixture of foreign matters in a semiconductor manufacturing process. Thus, the productivity is greatly affected. Therefore, as for the supporting glass substrate, it is also required not to have a great number of fragmental pieces when breaking occurs.

The present disclosure is designed in view of the foregoing issue, and it is an object thereof to provide a supporting glass substrate and a laminated body, which are capable of reducing damage and also capable of decreasing risks of being broken into a great number of fragmental pieces even if breaking occurs.

SUMMARY OF THE INVENTION

It is an object of the present invention to at least partially solve the problems in the conventional technology.

To solve the problem and achieve the object above, the supporting glass substrate of the present disclosure comprises a compression stress layer on a surface thereof, the supporting glass substrate having an average thermal expansion coefficient at 50° C. to 200° C. that is 7 ppm/° C. to 15 ppm/° C., an internal tensile stress that is 5 MPa to 55 MPa, and a depth of the compression stress layer that is 10 μm to 60 μm.

To solve the problem and achieve the object above, the laminated body of the present disclosure comprises the supporting glass substrate and a resin layer.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Hereinafter, a preferable embodiment of the present invention will be described in detail. Note that the present invention is not limited to the embodiment. If there are a plurality of embodiments, the present invention includes combinations of each of the embodiments. Furthermore, as for numerical values, ranges of rounded numbers thereof are to be included.

Configuration of Laminated Body

Figure 1:
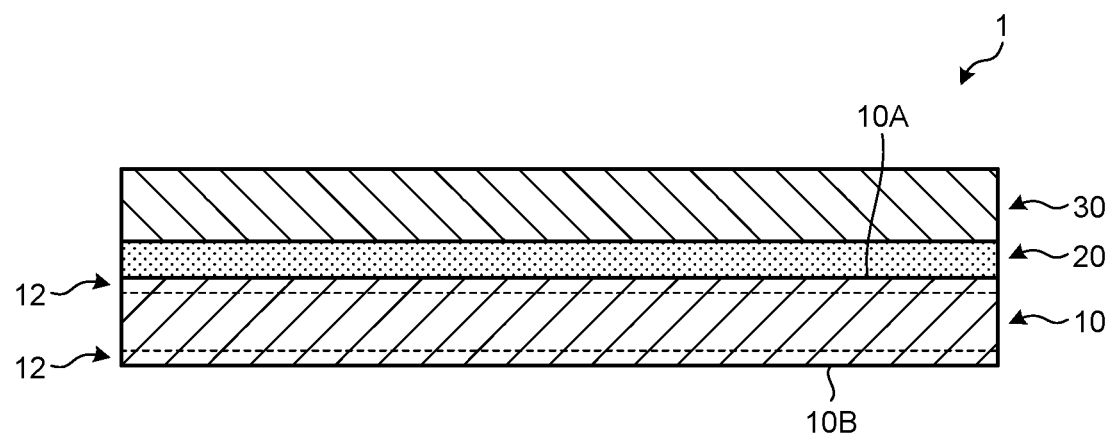
FIG. 1 is a schematic sectional view of a laminated body according to an embodiment.

FIG. 1 is a schematic sectional view of a laminated body according to the embodiment. As illustrated in FIG. 1, a laminated body 1 according to the embodiment includes a supporting glass substrate 10, an adsorption layer 20, and a resin layer 30. In the laminated body 1, the adsorption layer 20 is formed between the supporting glass substrate 10 and the resin layer 30. The adsorption layer 20 is a layer for adsorbing and separating the supporting glass substrate 10 and the resin layer 30, and a release layer and an adhesive layer, for example, are provided on the supporting glass substrate 10 in this order. Note, however, that the configuration and the material of the adsorption layer 20 may be determined as appropriate. The resin layer 30 is a layer including a resin and, in the embodiment, a semiconductor chip such as a silicon chip is formed in a sealant made of resin.

As described above, the supporting glass substrate 10 according to the embodiment is a glass substrate that supports the resin layer 30. More specifically, the supporting glass substrate 10 is used as a glass substrate for manufacturing a semiconductor package. Still more specifically, it is a supporting glass substrate used for manufacturing FOWLP and the like. The supporting glass substrate 10, however, is not limited to be used for manufacturing the FOWLP and the like but may be used as appropriate, and it may be used as a glass substrate for supporting members. Note that "FOWLP and the like" includes FOWLP and FOPLP as described above.

Thickness of Supporting Glass Substrate

A thickness t of the supporting glass substrate 10 is preferable to be 0.5 mm to 2.0 mm, and more preferable to be 0.7 mm to 1.5 mm. The thickness t refers to a length from a surface 10A of the supporting glass substrate 10 on the resin layer 30 side to the other surface 10B of the supporting glass substrate 10 on the opposite side of the resin layer 30. Setting the thickness t to be within such a range can reduce damage caused by making the supporting glass substrate 10 too thin. Note that the expression "0.5 mm to 2.0 mm" indicates "0.5 mm or larger and 2.0 mm or smaller", and the word "to" in numerical notation used hereinafter indicates the same.

Average Thermal Expansion Coefficient of Supporting Glass Substrate

The supporting glass substrate 10 has a high average thermal expansion coefficient. Specifically, the average thermal expansion coefficient CTE of the supporting glass substrate 10 at 50° C. to 200° C. is 7 ppm/° C. to 15 ppm/° C., preferable to be 9 to 13 ppm/° C., and more preferable to be 10 ppm/° C. to 12 ppm/° C. When CTE is within such ranges, the damage suppressing effect and the like of the supporting substrate as the effect of the present disclosure can be exhibited more effectively.

Compression Stress Layer of Supporting Glass Substrate

In the supporting glass substrate 10, a compression stress layer 12 is formed on the surface 10A which is at the resin layer 30 side and on the other surface 10B which is at the opposite side of the resin layer 30. In the supporting glass substrate 10, the compression stress layer 12 is formed by a chemical strengthening treatment. In the supporting glass substrate 10, the compression stress layer 12 may be formed on one of the surfaces (the surface 10A herein), but may not be formed on the other surface (the surface 10B herein).

Figure 2:
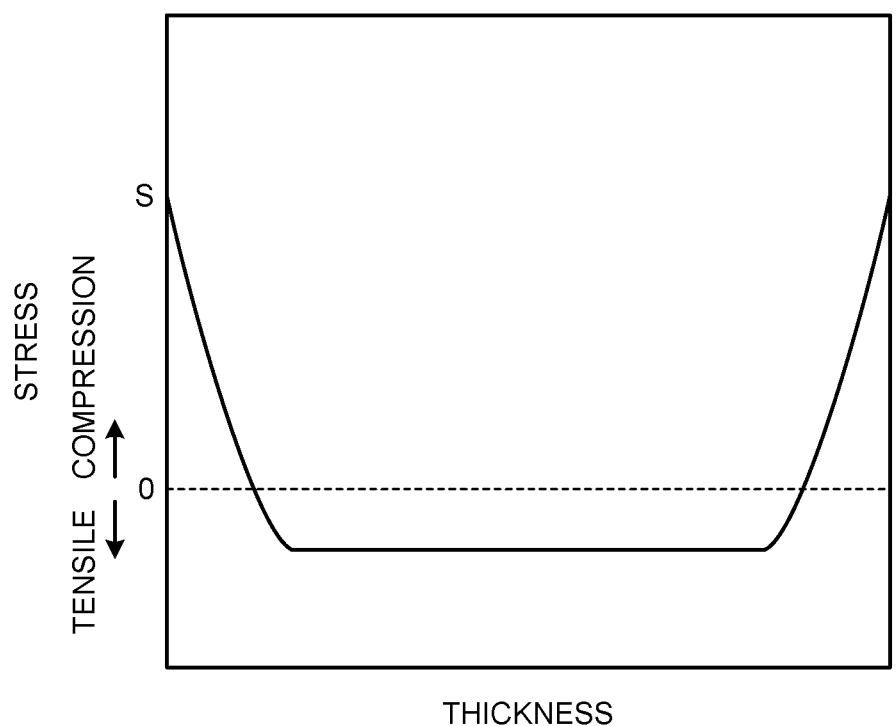
FIG. 2 is a graph illustrating an example of a stress distribution of a supporting glass substrate in a thickness direction.

FIG. 2 is a graph illustrating an example of a stress distribution of a supporting glass substrate in a thickness direction. The compression stress layer 12 is a layer where a compression stress is working in the supporting glass substrate 10. As illustrated in the example of FIG. 2, a compression stress S works on the surface of the supporting glass substrate 10, and the compression stress becomes smaller toward the center in the thickness direction of the supporting glass substrate 10. In the example of FIG. 2, the compression stress layer 12 can be defined to be a part from the surface to a depth at which the stress becomes "0" among the entire supporting glass substrate 10. In the supporting glass substrate 10, a tensile stress is working in the layer deeper than the depth at which the stress becomes "0". Hereinafter, the compression stress working on the surface of the supporting glass substrate 10, that is, on the compression stress layer 12, will be referred to as a surface compression stress CS. Furthermore, the tensile stress working inside the supporting glass substrate 10 will be referred to as an internal tensile stress CT.

Surface Compression Stress of Supporting Glass Substrate

As for the supporting glass substrate 10, the surface compression stress CS is preferable to be 500 MPa to 750 MPa and more preferable to be 650 MPa to 700 MPa. The method for measuring the surface compression stress CS may be selected as appropriate. For example, the surface compression stress CS may be measured by measuring distortion inside the supporting glass substrate 10 by using a photoelastic analysis method. In the embodiment, the surface compression stress CS may be measured by using, for example, FSM-6000LE that is a surface stress meter as a product of Orihara Industrial Co., Ltd. As for the supporting glass substrate 10, when the surface compression stress CS is 500 MPa or more, damage caused by thermal expansion can be reduced appropriately. When the surface compression stress CS is 700 MPa or less, damage can be appropriately reduced by preventing the internal tensile stress from increasing.

Depth of Compression Stress Layer of Supporting Glass Substrate

As for the supporting glass substrate 10, a depth DOL of the compression stress layer 12 is preferable to be 10 μm to 60 μm, and more preferable to be 15 μm to 30 μm. The depth DOL indicates the thickness of the compression stress layer 12 of the supporting glass substrate 10. That is, the depth DOL indicates the distance in the thickness direction from the surface of the supporting glass substrate 10 where the surface compression stress CS is working to the depth at which the value of the compression stress becomes "0". The method for measuring the depth DOL may be selected as appropriate. For example, the depth DOL may be measured by measuring distortion inside the supporting glass substrate 10 by using a photoelastic analysis method. In the embodiment, the depth DOL may be measured by using, for example, FSM-6000LE that is a surface stress meter as a product of Orihara Industrial Co., Ltd. As for the supporting glass substrate 10, when the depth DOL is 10 μm or more, damage caused by thermal expansion can be reduced appropriately. When the depth DOL is 15 μm or more, damage caused by thermal expansion can be more appropriately reduced. Furthermore, as for the supporting glass substrate 10, when the depth DOL is 60 μm or less, damage caused by thermal expansion can be reduced appropriately by preventing the internal tensile stress from increasing. When the depth DOL is 30 μm or less, damage can be more appropriately reduced.

Internal Tensile Stress of Supporting Glass Substrate

As for the supporting glass substrate 10, the internal tensile stress CT is preferable to be 5 MPa to 55 MPa and more preferable to be 15 MPa to 25 MPa. The internal tensile stress CT is calculated by following Expression (1). As for the supporting glass substrate 10, when the internal tensile stress CT is 5 MPa or more, the compression stress layer 12 is appropriately formed and damage caused by thermal expansion can be reduced appropriately. When the internal tensile stress CT is 15 MPa or more, damage caused by thermal expansion can be more appropriately reduced. Furthermore, as for the supporting glass substrate 10, when the internal tensile stress CT is 55 MPa or less, damage such as being broken into small fragments with a great number of fragmental pieces can be reduced appropriately. When the internal tensile stress CT is 25 MPa or less, damage such as being broken into small fragments can be more appropriately reduced.

$$CT=(CS \times DOL)/(t-2 \times DOL) \tag{1}$$

Note that in Expression (1), the thickness t is calculated in μm.

Composition of Supporting Glass Substrate

Next, the composition of the supporting glass substrate 10 will be described. The supporting glass substrate 10 has a high average thermal expansion coefficient CTE as described above. Glass with the high average thermal expansion coefficient CTE exhibits a weak bonding force between atoms, so that there may be a case where it is difficult to form the compression stress layer 12 by chemical strengthening. In contrast, with the supporting glass substrate 10 having the compositions to be described later, it is possible to appropriately form the compression stress layer 12 by chemical strengthening. It is to be noted, however, that the compositions described later are examples. Furthermore, the compositions described later indicate the compositions of the supporting glass substrate 10 before undergoing the chemical strengthening to be described later. The compositions to be described later also are considered to be the compositions of the supporting glass substrate 10 in the part other than the compression stress layer 12.

As for the supporting glass substrate 10, in mol % in terms of oxides, the content of $Na_2O$ is preferable to be 5% to 15%, and the content of $K_2O$ is preferable to be 5% to 15%, with respect to the total amount of the supporting glass substrate 10. As for the supporting glass substrate 10, in mol % in terms of oxides, the content of $Na_2O$ is more preferable to be 8% to 12%, and the content of $K_2O$ is more preferable to be 8% to 12%, with respect to the total amount of the supporting glass substrate 10. By setting the content of $Na_2O$ and $K_2O$ to fall within such ranges, Na ions can be appropriately substituted with K ions, so that chemical strengthening for forming the compression stress layer 12 can be appropriately applied. As for the supporting glass substrate 10, in mol % in terms of oxides, the content of MgO is preferable to be 5% to 10%, more preferable to be 6% to 9%, and still more preferable to be 7% to 8.5%, with respect to the total amount of the supporting glass substrate 10. Furthermore, as for the supporting glass substrate 10, in mol % in terms of oxides, the content of $ZrO_2$ is preferable to be 0% to 5%, more preferable to be 0% to 3%, and still more preferable to be 0.5% to 2%, with respect to the total amount of the supporting glass substrate 10. By setting the content of MgO and $ZrO_2$ to fall within such ranges, strength and fracture toughness of the glass as the base material can be appropriately enhanced, so that chemical strengthening for forming the compression stress layer 12 can be appropriately applied.

Moreover, it is preferable for the supporting glass substrate 10 of the embodiment to contain following compounds in mol % in terms of oxides. By setting the composition of the supporting glass substrate 10 as follows, it becomes possible to appropriately apply chemical strengthening for forming the compression stress layer 12 while keeping the average thermal expansion coefficient CTE high.

$SiO_2$: 50% to 80%
$Al_2O_3$: 1% to 10%
MgO: 5% to 10%
CaO: 1% to 10%
SrO: 0% to 5%
BaO: 0% to 5%
$Na_2O$: 5% to 15%
$K_2O$: 5% to 15%
$ZrO_2$: 0% to 5%

It is more preferable for the supporting glass substrate 10 to contain following compounds in mol % in terms of oxides. By setting the composition of the supporting glass substrate 10 as follows, it becomes possible to more appropriately apply chemical strengthening for forming the compression stress layer 12 while keeping the average thermal expansion coefficient CTE higher.

$SiO_2$: 60% to 65%
$Al_2O_3$: 3% to 8%
MgO: 6% to 9%
CaO: 2% to 8%
SrO: 0% to 3%
BaO: 0% to 3%
$Na_2O$: 7% to 13%
$K_2O$: 7% to 13%
$ZrO_2$: 0% to 3%

It is still more preferable for the supporting glass substrate 10 to contain following compounds in mol % in terms of oxides. By setting the composition of the supporting glass substrate 10 as follows, it becomes possible to more appropriately apply chemical strengthening for forming the compression stress layer 12 while keeping the average thermal expansion coefficient CTE still higher.

$SiO_2$: 62% to 64%
$Al_2O_3$: 4% to 6%
MgO: 7% to 8.5%
CaO: 3% to 5%
SrO: 0%
BaO: 0%
$Na_2O$: 8% to 12%
$K_2O$: 8% to 12%
$ZrO_2$: 0.5% to 2%

While "0%" herein means that the compounds are not contained, such compounds may be contained as unavoidable impurities.

Note that the supporting glass substrate 10 is amorphous glass, that is, an amorphous solid. The supporting glass substrate 10 may contain crystalized glass at least in a part thereof. It is, however, preferable for the supporting glass substrate 10 not to contain sintered bodies formed when ceramics such as oxides are sintered.

Manufacturing Method of Supporting Glass Substrate

Next, a manufacturing method of the supporting glass substrate 10 will be described. With the manufacturing method of the supporting glass substrate 10, first, a glass substrate is manufactured, and the compression stress layer 12 is formed on the surface of the glass substrate by applying a chemical strengthening treatment to the glass substrate so as to manufacture the supporting glass substrate 10. That is, the glass substrate herein is the supporting glass substrate 10 before undergoing chemical strengthening.

The method for manufacturing the glass substrate in the above-described manufacturing method is not specifically limited. Examples thereof may be downdraw methods (an overflow downdraw method, a slot down method, a redraw method, and the like), a float method, a rollout method, and a press method.

With the manufacturing method, the compression stress layer 12 is formed by applying a chemical strengthening treatment on the manufactured glass substrate so as to manufacture the supporting glass substrate 10. With the manufacturing method, the chemical strengthening treatment is applied on the manufactured glass substrate such that the internal tensile stress CT and the depth DOL fall within the ranges defined above and, more preferably, the internal tensile stress CT, the surface compression stress CS, and the depth DOL fall within the ranges defined above. In the chemical strengthening treatment of the embodiment, the glass substrate is brought in contact with molten salt containing alkali metal ions to form the compression stress layer 12. For example, in the embodiment, the glass substrate is immersed in a solution of molten salt containing alkali metal ions of large ionic radius, that is, for example a solution of potassium nitrate containing K ions. Thereby, metal ions (Na ions herein) with smaller ionic radius than that of the alkali metal ions contained in the molten salt are substituted with the alkali metal ions contained in the molten salt. A compression stress is generated in the surface of the glass substrate due to a difference in the occupied area of the alkali metal ions, thereby forming the compression stress layer 12.

In the embodiment, a heating temperature of the molten salt (a solution of the molten salt) to be in contact with the glass substrate is preferable to be 370° C. to 480° C., and more preferable to be 400° C. to 450° C. Furthermore, in the embodiment, the contact time of the glass substrate with the molten salt is preferable to be 0.5 hour to 32 hours, and more preferable to be 3 hours to 6 hours. By setting the heating temperature and the contact time to fall within such ranges, it is possible to have appropriate values of the internal tensile stress CT, the surface compression stress CS, and the depth DOL.

Furthermore, as the molten salt to be brought into contact with the glass substrate, it is preferable to use salt containing potassium ions. Examples of the molten salt to be brought into contact with the glass substrate may be alkali nitrates such as potassium nitrate, potassium sulfate, potassium carbonate, potassium chloride, alkali sulfate, and alkali chloride. Such molten salts may be used alone or a plurality of those may be used in combination. Furthermore, in order to control the chemical strengthening characteristic, salt containing sodium (Na ions) or lithium (Li ions) may be mixed as well.

As described, in the supporting glass substrate 10 according to the embodiment, the compression stress layer 12 is formed by the chemical strengthening treatment. Thus, the compression stress layer 12 of the supporting glass substrate 10 according to the embodiment is considered to be the layer in which alkali metal elements of small ionic radius are substituted with alkali metal elements of large ionic radius contained in the molten salt. In other words, assuming that the alkali metal elements contained in the molten salt as substitution elements, the number of substitution elements contained in a unit volume of the compression stress layer 12 of the supporting glass substrate 10 is greater than the number of substitution elements contained in a unit volume of the layers other than the compression stress layer 12. The substitution element herein is potassium, for example.

As for the supporting glass substrate that supports members, the temperature distribution when heated may become nonuniform in some cases. In such a case, it is concerned that the supporting glass substrate may be warped and damaged because the thermal expansion amount varies at each position due to the difference in the temperature distribution. In particular, the supporting glass substrate of high average thermal expansion coefficient CTE has a large difference in the thermal expansion coefficients at each of the positions, so that there is a high risk of damage caused by the warp.

in contrast, the supporting glass substrate 10 according to the embodiment includes the compression stress layer 12 on the surface thereof, the average thermal expansion coefficient CTE at 50° C. to 200° C. is 7 ppm/° C. to 15 ppm/° C., the internal tensile stress CT is 10 MPa to 55 MPa, and the depth DOL of the compression stress layer 12 is 10 µm to 60 µm. By setting the average thermal expansion coefficient CTE of the supporting glass substrate 10 according to the embodiment to fall within such a range, it is possible to follow thermal expansion even when the thermal expansion coefficient of the member to be supported is high, so that separation from the member can be reduced. Furthermore, by setting the internal tensile stress CT and the depth DOL of the supporting glass substrate 10 according to the embodiment to fall within such ranges, it is possible to form the compression stress layer 12 on the surface. It can reduce damage caused by the difference in the thermal expansion amounts at each of the positions even in a case where the average thermal expansion coefficient CTE is high. Furthermore, by setting the internal tensile stress CT to be 55 MPa or less, the number of fragmental pieces can be reduced even if there is damage. Therefore, the supporting glass substrate 10 is appropriately used for the supporting substrates of semiconductor packages that are particularly susceptible to contamination.

The supporting glass substrate 10 is preferable to be a supporting glass substrate used for manufacturing at least one selected from a fan out wafer level package and a fan out panel level package. The supporting glass substrate 10 is appropriately used for a fan out level package and a fan out panel level package.

EXAMPLES

Next, Examples will be described. Note that the mode of the embodiment may be changed as long as the effect of the invention can be achieved.

In Examples, raw plates of glass substrates with 2.0 m in width and 2.0 mm in thickness were manufactured by a float method with the compositions of Table 1. As for the composition A of Table 1, values are rounded off to the first decimal places. When each value in the composition A is added up, the total is actually 100 mol %.

TABLE 1

| Composition [mol %] | $SiO_2$ | $Al_2O_3$ | MgO | CaO | SrO | BaO | $Na_2O$ | $K_2O$ | $ZrO_2$ | Total |
|---|---|---|---|---|---|---|---|---|---|---|
| Composition A | 63.5 | 5.0 | 8.0 | 4.0 | 0.0 | 0.0 | 9.4 | 8.9 | 1.3 | 100 |
| Composition B | 65 | 5 | 0 | 5 | 0 | 0 | 5 | 20 | 0 | 100 |

Preparation of Samples for Evaluation

Samples A, samples B, and samples C are prepared for each of the manufactured raw plates.

Sample A

For preparing the sample A, glass in a square of 20 mm in length and 20 mm in breadth was cut out from the center part of the raw plate, and both surfaces of the cutout glass were mirror-polished by using a cerium abrasive to adjust the thickness to be 0.8 mm so as to fabricate a glass substrate. Chemical strengthening was applied to the glass substrate to prepare the sample A.

For chemical strengthening of the sample A, the glass substrate was immersed in a treatment tank with $KNO_3$ and the heating temperature of the solution and the immersing time (contact time) were set for each of Example 1 to Example 4 and Comparative Example 1 to Comparative Example 3 of Table 2 to be described later. Specifically, conditions were set as follows.

Example 1

Heating temperature of solution was set as 400° C., and immersing time was set as 4 hours.

Example 2

Heating temperature of solution was set as 400° C., and immersing time was set as 32 hours.

Example 3

Heating temperature of solution was set as 450° C., and immersing time was set as 8 hours.

Example 4

Heating temperature of solution was set as 400° C., and immersing time was set as 0.5 hour.

Comparative Example 1

Heating temperature of solution was set as 450° C., and immersing time was set as 32 hours.

Comparative Example 2

Heating temperature of solution was set as 400° C., and immersing time was set as 0.25 hour.

Comparative Example 3

No strengthening.
Sample B

For preparing the sample B, glass in a rectangle of 5 mm in length and 70 mm in breadth was cut out from the center part of the raw plate, and both surfaces of the cutout glass were mirror-polished by using a cerium abrasive to adjust the thickness to be 0.8 mm so as to fabricate a glass substrate. Chemical strengthening was applied to the glass substrate to prepare the sample B.

For chemical strengthening of the sample B, the glass substrate was immersed in a treatment tank with $KNO_3$ and the heating temperature of the solution and the immersing time (contact time) were set for each of Example 1 to Example 4 and Comparative Example 1 to Comparative Example 3 of Table 2 to be described later. The heating temperatures of the solution and the immersing time (contact time) for the sample B were the same as those of the sample A.
Sample C For preparing the sample C, glass in a rectangle of 6 mm in length and 25 mm in breadth was cut out from the center part of the raw plate, and both surfaces of the cutout glass were mirror-polished by using a cerium abrasive to adjust the thickness to be 0.8 mm so as to prepare the sample C.
Characteristics of Evaluation Samples The characteristics of the samples prepared as described above were checked as follows.

Measurement of Average Thermal Expansion Coefficient CTE

The average thermal expansion coefficients CTE of the samples C at 50 to 200° C. were measured in accordance with DIN-51045-1 as the standards of thermal expansion measurement. Specifically, the thermal expansion coefficients of the samples C were measured in a range of 30 to 300° C. by using, as a measurement device, a dilatometer (DIL 402 Expedis) as a product of NETZSCH and, among those, the average thermal expansion coefficients in a range of 50 to 200° C. were taken as the average thermal expansion coefficients CTE.

Measurement of Surface Compression Stress

The compression stresses of the surfaces of the samples A were measured by using a surface stress meter (FSM-6000LE: Orihara Industrial Co., Ltd.) to acquire the surface compression stress CS.

Measurement of Depth of Compression Stress Layer

The depths of the compression stress from the surface of the samples A were measured by using a surface stress meter (FSM-6000LE: Orihara Industrial Co., Ltd.) to acquire the depths DOL of the compression stress layer 12.

Calculation of Internal Tensile Stress

The internal tensile stress CT was calculated by Expression (1) mentioned above by using the measured surface compression stress CS, depth DOL of the compression stress layer 12, and the value, 0.8 mm, of the thickness t.

Evaluation of Samples

The samples prepared in the manner as described above were evaluated as follows.

Evaluation of Flexural strength

Flexural strengths F of the samples B were acquired in accordance with the testing method for flexural strength of fine ceramics at room temperature (JIS: R-1601).

The flexural strength F was evaluated as follows:

case where the flexural strength F is higher than 500 MPa is defined as "Good";

case where the flexural strength F is 300 MPa or higher and 500 MPa or less is defined as "Fair"; and case where the flexural strength F is lower than 300 MPa is defined as "Poor".

"Good" and "Fair" were evaluated as satisfactory.

Evaluation of Breaking

As an indenter indentation test, a pyramid diamond indenter with a tip having a dihedral angle of 90° C. was pressed at the center part of the samples A at 3.0 kgf to 15 kgf, and the fragmental piece number N when broken was measured by using, as a measurement device, ARS-9000 that is a product of Future Tech.

Case where the fragmental piece number N is 3 or less is defined as "Good";

case where the fragmental piece number N is 4 or more and 10 or less is defined as "Fair"; and case where the fragmental piece number N is 11 or more is defined as "Poor".

"Good" and "Fair" were evaluated as satisfactory.

The evaluation results of Example 1 to Example 4 and Comparative Example 1 to Comparative Example 3 are written in Table 2.

TABLE 2

| | | Conditions | | | | Evaluation Results | | | |
|---|---|---|---|---|---|---|---|---|---|
| | | Thermal Expansion | Strengthening Characteristics | | | Flexural Strength | | Cracking | |
| | Composition | Coefficient CTE [ppm/° C.] | Surface Compression Stress CS [MPa] | Depth DOL of Compression Stress Layer [μm] | Internal Tensile Stress CT [MPa] | Flexural Strength [Mpa] | Rating | Number of Pieces | Rating |
| Example 1 | Composition A | 10.5 | 673 | 23 | 20 | 550 | Good | 2 | Good |
| Example 2 | Composition A | 10.5 | 652 | 56 | 53 | 601 | Good | 4 | Fair |
| Example 3 | Composition A | 10.5 | 509 | 58 | 44 | 541 | Good | 4 | Fair |
| Example 4 | Composition A | 10.5 | 539 | 12 | 8 | 316 | Fair | 2 | Good |
| Comparative Example 1 | Composition A | 10.5 | 431 | 85 | 58 | 463 | Fair | >50 | Poor |
| Comparative Example 2 | Composition A | 10.5 | 523 | 8 | 4 | 294 | Poor | 2 | Good |
| Comparative Example 3 | Composition B | 13.0 | — | | | — | | | |

When Example 1 to Example 4 and Comparative Example 1 to Comparative Example 2 are compared, it can be found that the evaluations of both flexural strength and breaking state are satisfied when the internal tensile stress CT is 5 MPa to 55 MPa and the depth DOL of the compression stress layer 12 is 10 μm to 60 μm. Comparative Example 3 is the case where the glass plate was broken during chemical strengthening.

According to the present invention, it is possible to reduce damage and risks of being broken into a great number of fragmental pieces when breaking occurs.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A supporting glass substrate comprising a compression stress layer on a surface thereof, the supporting glass substrate having:
   an average thermal expansion coefficient at 50° C. to 200° C. that is 7 ppm/° C. to 15 ppm/° C.,
   an internal tensile stress that is 5 MPa to 55 MPa, and
   a depth of the compression stress layer that is 10 μm to 60 μm,
   wherein the supporting glass substrate comprises the following compounds in mol % in terms of oxides:
   $SiO_2$: 62% to 64%,
   $Al_2O_3$: 4% to 6%,
   MgO: 7% to 8.5%,
   CaO: 3% to 5%,
   $Na_2O$: 8% to 12%,
   $K_2O$: 8% to 12%, and
   $ZrO_2$: 0.5% to 2%, and
   wherein the compression stress layer is formed by chemical strengthening treatment of the supporting glass substrate.

2. The supporting glass substrate according to claim 1, wherein the average thermal expansion coefficient at 50° C. to 200° C. is 9 ppm/° C. to 13 ppm/° C.

3. The supporting glass substrate according to claim 1, wherein the internal tensile stress is 15 MPa to 25 MPa.

4. The supporting glass substrate according to claim 1, wherein the depth of the compression stress layer is 15 μm to 30 μm.

5. The supporting glass substrate according to claim 1, wherein a surface compression stress is 500 MPa to 700 MPa.

6. The supporting glass substrate according to claim 1, wherein
   the supporting glass substrate has a thickness of 0.5 mm to 2.0 mm, and
   the depth of the compression stress layer is 15 μm to 30 μm.

7. The supporting glass substrate according to claim 1, wherein, in mol % in terms of oxides, a content of MgO is 6% or more and 9% or less, and a content of $ZrO_2$ is 0.5% or more and 2% or less, with respect to a total amount of the supporting glass substrate.

8. The supporting glass substrate according to claim 1, wherein the supporting glass substrate is a supporting glass substrate used for manufacturing at least one selected from a fan out wafer level package or a fan out panel level package.

9. A laminated body comprising:
   the supporting glass substrate according to claim 1; and
   a resin layer.

10. The supporting glass substrate according to claim 1, wherein the supporting glass substrate does not comprise oxides other than $SiO_2$, $Al_2O_3$, MgO, CaO, $Na_2O$, $K_2O$, $ZrO_2$, and unavoidable impurities.

* * * * *